(12) United States Patent
Tawns

(10) Patent No.: US 6,851,657 B2
(45) Date of Patent: Feb. 8, 2005

(54) HIGH PRESSURE GASEOUS FUEL SOLENOID VALVE

(75) Inventor: Gregg Tawns, Winnipeg (CA)

(73) Assignee: Pinnacle CNG Systems, LLC, Midland, TX (US)

( * ) Notice: Subject to any disclaimer, the term of this patent is extended or adjusted under 35 U.S.C. 154(b) by 81 days.

(21) Appl. No.: 10/340,727

(22) Filed: Jan. 13, 2003

(65) Prior Publication Data

US 2003/0197142 A1 Oct. 23, 2003

Related U.S. Application Data

(60) Provisional application No. 60/373,638, filed on Apr. 19, 2002.

(51) Int. Cl.[7] .............................................. A61K 31/12
(52) U.S. Cl. .................................... 251/30.03; 251/333
(58) Field of Search ........................ 251/30.03, 30.04, 251/333, 129.14, 129.15

(56) References Cited

U.S. PATENT DOCUMENTS

| | | | | |
|---|---|---|---|---|
| 3,100,103 A | * | 8/1963 | Bullard | 251/30.03 |
| 4,434,765 A | * | 3/1984 | Eshelman | 251/129.14 |
| 4,527,600 A | | 7/1985 | Fisher et al. | |
| 5,076,499 A | * | 12/1991 | Cranford | 251/129.14 |
| 5,188,017 A | | 2/1993 | Grant et al. | |
| 5,197,710 A | | 3/1993 | Wass et al. | |
| 5,238,030 A | | 8/1993 | Miller et al. | |
| 5,269,280 A | | 12/1993 | Braun et al. | |
| 5,503,185 A | | 4/1996 | Krause | |
| 5,540,387 A | | 7/1996 | Reiter et al. | |
| 5,562,117 A | | 10/1996 | Borland et al. | |
| 5,626,325 A | * | 5/1997 | Buchanan et al. | 251/129.14 |
| 5,730,509 A | * | 3/1998 | Eith et al. | 251/129.14 |
| 5,865,371 A | | 2/1999 | Pace et al. | |
| 6,293,513 B1 | * | 9/2001 | Birkelund | 251/30.03 |
| 6,321,775 B1 | | 11/2001 | Hildebrand et al. | |
| 6,363,915 B1 | | 4/2002 | Cohen | |
| 6,422,488 B1 | | 7/2002 | Fochtman et al. | |
| 6,474,101 B1 | | 11/2002 | Quine et al. | |
| 6,484,699 B2 | | 11/2002 | Paul et al. | |

* cited by examiner

*Primary Examiner*—John Bastianelli
(74) *Attorney, Agent, or Firm*—Martin Korn; Monty L. Ross; Locke Liddell & Sapp LLP

(57) ABSTRACT

A valve operable between a valve close position and a valve open position for a gaseous fuel system includes a housing having a fuel inlet port, a fuel outlet port and a chamber disposed between the fuel inlet port and the fuel outlet port A valve seat is disposed adjacent the fuel outlet port and includes an aperture. The valve further includes a magnetic coil and an armature magnetically coupled to the magnetic coil and disposed with in the housing. The armature is movable in response to the magnetic coil. A piston is coupled to the armature and is movable within the chamber away from the seat when the magnetic coil is actuated in the valve open position. Fuel flows from the inlet port through the chamber to the outlet port. The piston engages the seat when the magnetic coil is deactuated in the valve close position to prevent fuel from flowing from the inlet port to the outlet port. The piston includes a projection or radius for closing the valve seat aperture.

7 Claims, 3 Drawing Sheets

HIGH PRESSURE GASEOUS FUEL SOLENOID VALVE

RELATED APPLICATION

This application claims the benefits of provisional application Ser. No. 60/373,638, filed Apr. 19, 2002 and entitled "High Pressure Gaseous Fuel Solenoid Valve".

TECHNICAL FIELD OF THE INVENTION

The present invention relates to valves for use with compressed natural gas fuel and more particularly to a high pressure gaseous fuel solenoid valve.

BACKGROUND OF THE INVENTION

High pressure solenoid valves are utilized in applications where high pressure gaseous fuel is either dispensed to or used in a fuel injection system of a vehicle equipped in such manner. Compressed natural gas is becoming a common automotive fuel for commercial fleet vehicles and residential customers. In vehicles, the compressed natural gas is delivered to the engine in precise amounts through gas injectors. The compressed natural gas injector is required to deliver a precise amount of fuel per injection pulse and maintain this accuracy over the life of the injector.

An electromagnetic fuel injector utilizes a solenoid assembly to supply an actuating force to a fuel metering valve. Typically, a plunger-style armature supporting a fuel injector needle reciprocates between a closed position, where the needle is closed to prevent fuel from escaping through the discharge orifice, and a fully open position, where fuel is discharged through the discharge orifice.

When the solenoid is energized, the solenoid armature, and thus the injector needle, is magnetically drawn from the closed position toward the fully open position by a solenoid generated magnetic flux. The flow capacity of such valves and their reliability is critical to the operation of such fuel injectors. A need has arisen for a valve having improved flow capacity and reliability to insure that positive sealing of the valve takes places when the valve is closed.

SUMMARY OF THE INVENTION

In accordance with the present invention, a valve operable between a valve close position and a valve open position for a gaseous fuel system is provided. The valve includes a housing having a fuel inlet port, a fuel outlet port and a chamber disposed between the fuel inlet port and the fuel outlet port. A valve seat is disposed adjacent the fuel outlet port and includes an aperture. The valve further includes a magnetic coil and an armature magnetically coupled to the magnetic coil and disposed with in the housing. The armature is movable in response to the magnetic coil. A piston is coupled to the armature and is movable within the chamber away from the seat when the magnetic coil is actuated in the valve open position. Fuel flows from the inlet port through the chamber to the outlet port. The piston engages the seat when the magnetic coil is deactuated in the valve close position to prevent fuel from flowing from the inlet port to the outlet port. The piston includes a projection for closing the valve seat aperture.

In accordance with another aspect of the present invention, a valve operable between a valve close position and a valve open position for a gaseous fuel system is provided. The valve includes a housing having a fuel inlet port, a fuel outlet port and a chamber disposed between the fuel inlet port and the fuel outlet port. A valve seat is disposed adjacent the fuel outlet port and includes a convex radius surface surrounding the fuel outlet port. The valve further includes a magnetic coil and an armature magnetically coupled to the magnetic coil and disposed with in the housing. The armature is movable in response to the magnetic coil. A piston is coupled to the armature and is movable within the chamber away from the seat when the magnetic coil is actuated in the valve open position. Fuel flows from the inlet port through the chamber to the outlet port. The piston including a radius surface that engages the radius surface of the seat when the magnetic coil is deactuated in the valve close position to prevent fuel from flowing from the inlet port to the outlet port.

DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
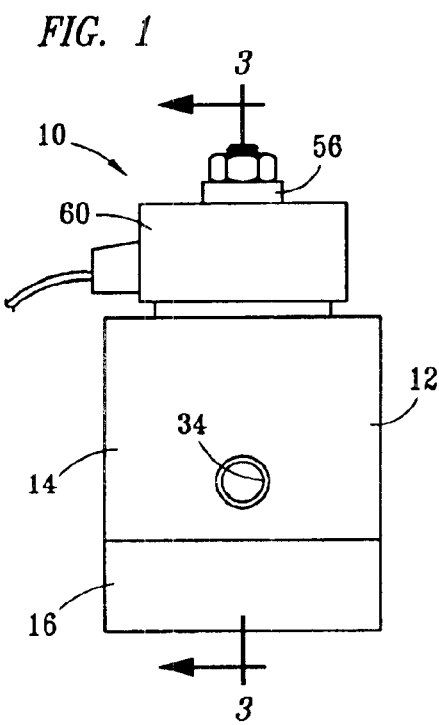
FIG. 1 is a side elevational view of the present valve.
Figure 2:
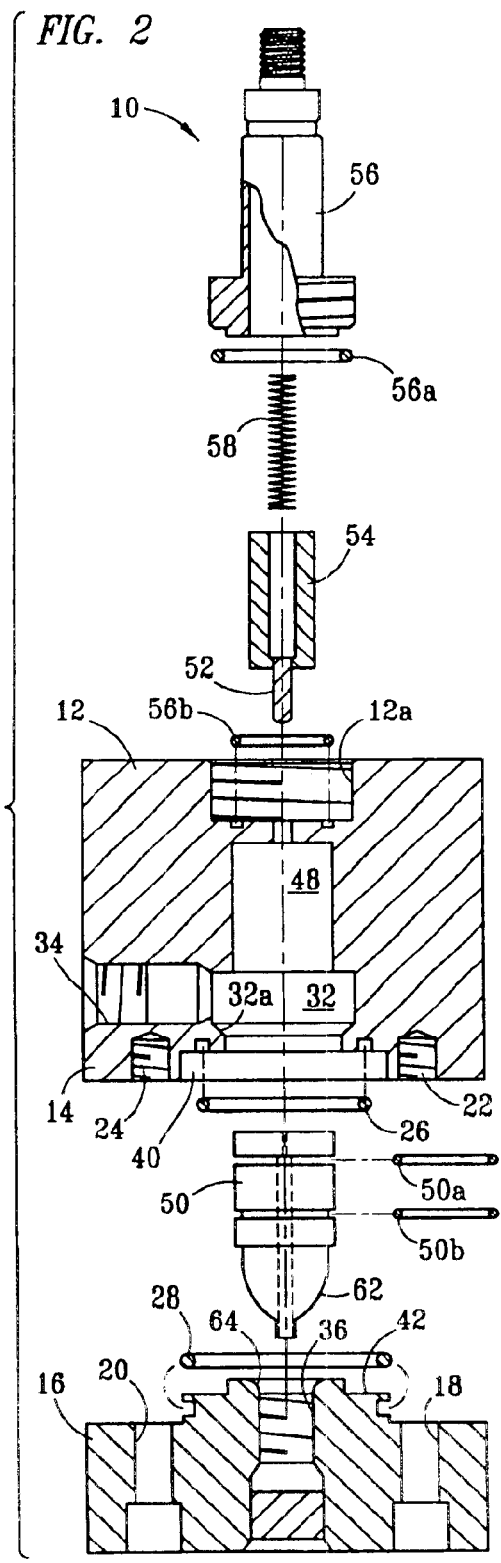
FIG. 2 is an explode sectional view of the valve of FIG. 1.
Figure 3:
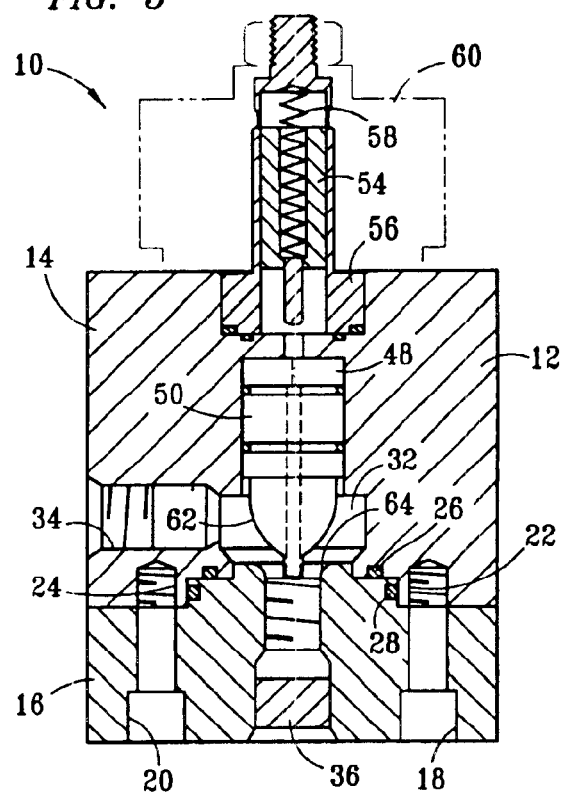
FIG. 3 is a cross-sectional view taken generally along section lines 3—3 of FIG. 1 showing the value in the fully open position.
Figure 4:
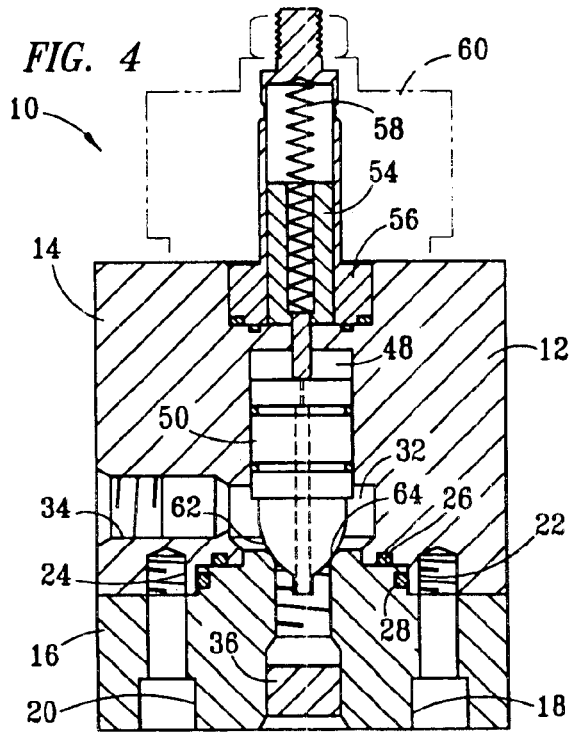
FIG. 4 is a sectional view of the valve of FIG. 1 shown in the fully closed position.

Referring simultaneously to FIGS. 1–4, the present valve is illustrated, and is generally identified by the numeral 10. Valve 10 operates between an open position as illustrated in FIG. 3 and a closed position as illustrated in FIG. 4. Valve 10 includes a housing 12 having an upper housing portion 14 and a lower housing portion 16. Upper housing portion 14 and lower housing portion 16 are interconnected by fasteners (not shown) received by apertures 18 and 20 within lower housing portion 16 and threaded apertures 22 and 24 in upper housing portion 14. O-rings 26 and 28 are disposed in upper housing portion 14 and lower housing portion 16, respectively for sealing the junction between upper housing portion 14 and lower housing portion 16.

Disposed within upper housing portion 14 is a chamber 32 having an angled bottom 32a. In communication with chamber 32 is a gaseous fuel input port 34 disposed within upper housing portion 14 of housing 12. Also in communication with chamber 32 is a gaseous fuel outlet port 36 disposed within lower housing portion 16 of housing 12. Fuel flows between input port 34, through chamber 32 and out through outlet port 36 of valve 10. Upper housing portion 14 includes a recess 40 which receives a step 42 on lower housing portion 16 to align portions 14 and 16 prior to and after attachment.

Slidably disposed within a bore 48 in upper housing portion 14 is a piston 50 having O-rings 50a and 50b. Piston 50 operates to open and close the fluid communication path between inlet port 34 and outlet port 36 through chamber 32. Piston 50 is interconnected to an actuator pin 52 which is coupled to an armature 54. Armature 54 slides within a stem cylinder 56 which is connected to a housing 12 threaded aperture 12a and sealed using O-rings 56a and 56b. A retaining spring 58 is disposed within armature 54. Armature 54 is retained by cylinder 56. An electromagnetic coil 60 is disposed around cylinder 56. Coil 60 and armature 54 form an electromagnet.

An important aspect of the valve 10 is the configuration of piston 50 having a convex radius 62 which mates with a valve seat 64 disposed around outlet port 36. Seat 64 also has a convex radius. The contact between piston 50 and seat 64 provides a positive seal for valve 10 when in the closed position. No wear takes places between piston 50 and seat 64. The elimination of this wear prevents valve 10 from sticking and not opening. Radius 62 also provides a self-centering effect each time piston 50 seats within seat 64.

In operation of valve 10, when valve 10 is energized by coil 60, the opening sequence begins and valve 10 remains open until coil 60 is de-energized. When first energized, armature 54 of valve 10 is attracted to coil 60. As the armature 54 moves in response to the magnetic attraction, spring 56 is compressed and armature 54 pulls actuator pin 52 away from output port 36 to move piston 50 away from seat 64. This initial movement allows the differential pressure to be overcome within housing 12 and further movement of piston 50 takes places until valve 10 is fully open (FIG. 3) and armature 54 is withdrawn within cylinder 56. Electromagnetic forces of coil 60 hold with enough force to resist the downward force acting on it as gaseous fuel flows through chamber 32. The size of outlet port 36 and chamber 32 are sized such that the down force cannot exceed the force exerted on armature 54 by electromagnet 56. The pressures acting on piston 50 hold piston 50 in the full open position as illustrated in FIG. 3. In the open position of FIG. 3, chamber 32 is unobstructed to allow for maximized gaseous fuel flow with reduced turbulence. The configuration of chamber 32 with the angled bottom 32a, further smoothes the flow of fuel.

In the valve close position as illustrated in FIG. 4, coil 60 is de-energized such that armature 54 moves toward lower housing portion 16 of housing 12, and spring 58 extends to force piston 50 into engagement with seat 64, thereby closing valve 10. Piston 50 is held tightly against seat 64 by spring 58 as well as the differential pressure within valve 10.

Figure 5:
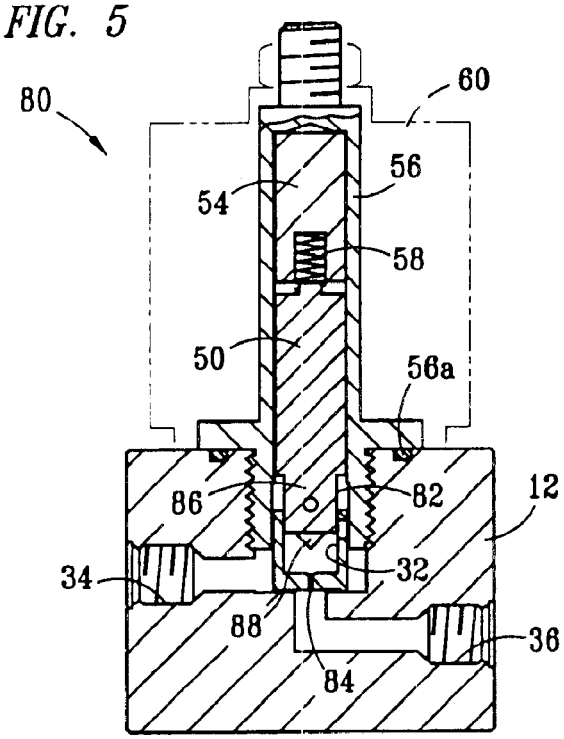
FIG. 5 is a sectional view of an additional embodiment of the present valve shown in the fully open position.
Figure 6:
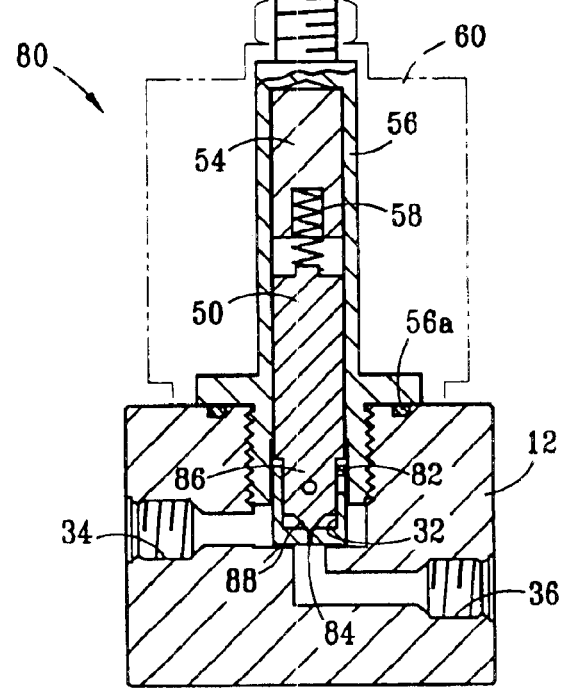
FIG. 6 is a sectional view of the valve shown in FIG. 5 in the fully closed position.

Referring now to FIGS. 5 and 6, an additional embodiment of the present valve is illustrated, and is generally identified by the numeral 80. Like and corresponding reference numerals are utilized for components previously identified with respect to valve 10. Valve 80 includes a valve seat 82 disposed within chamber 32. Seat 82 includes an aperture 84 in communication with outlet port 36. Coupled to armature 54 is a piston 86. Piston 86 includes a projection 88 which engages aperture 84 of seat 82. As piston 86 moves away from seat 82 through operation of electromagnet 56, projection 88 withdraws from aperture 84 to provide a gaseous fluid communication path between inlet port 32 and outlet port 36 via chamber 32. Valve 80 operates in a manner similar to valve 10 as previously described.

Therefore, it can be seen that the present valve provides for a valve that is simple in construction having minimum components and thereby reducing production costs. The present valves have increased flow with minimal opportunity for malfunction and have increased sealing of the valve with minimization of piston wear. The overall reliability of the present valve is increased due to self-centering, positive sealing of the piston and valve seat.

The above descriptions of certain embodiments are made for the purposes of illustration only and are not intended to be limiting in any manner. Other alterations and modifications of the preferred embodiment will become apparent to those of ordinary skill in the art upon reading this disclosure, and it is intended that the scope of the invention disclosed herein be limited only by the broadest interpretation of the appended claims to which the inventor is legally entitled.

I claim:

1. A valve operable between a valve closed position and a valve opened position for a gaseous fuel system comprising:

a housing having a gaseous fuel inlet port, a gaseous fuel outlet port and a chamber disposed between said gaseous inlet port and said gaseous fuel outlet port;

a valve seat disposed adjacent said gaseous fuel outlet port and including a convex radius surface surrounding said gaseous fuel outlet port;

a magnetic coil;

an armature magnetically coupled to said magnetic coil and disposed within said housing and being movably responsive to said magnetic coil;

said armature having an actuator pin;

a piston engaging said actuator pin of said armature and being movable within said chamber away from said seat when said magnetic coil is actuated in the valve open position, such that gaseous fuel flows from said gaseous fuel inlet port through said chamber to said gaseous fuel outlet port and said piston engaging said seat when said magnetic coil is deactuated in the valve closed position to prevent gaseous fuel flowing from said inlet port to said gaseous fuel outlet port; and said piston including a radius surface for engaging said radius surface of said valve seat for closing said gaseous fuel outlet port and said piston having an aperture therethrough with said aperture extending through said radius surface of said piston.

2. The valve of claim 1 wherein said housing includes:

an upper portion including said gaseous fuel inlet port and said chamber; and a lower portion including said gaseous outlet port and said valve seat.

3. The valve of claim 2 and further including an O-ring disposed between said housing upper portion and said housing lower portion.

4. The valve of claim 2 wherein said housing upper portion includes a recess and said housing lower portion includes a step received within said housing upper portion recess.

5. The valve of claim 1 wherein said piston's radius surface being convex.

6. The valve of claim 1 wherein said chamber includes an angled surface adjacent said valve seat.

7. The valve of claim 1 wherein said piston includes an O-ring.

\* \* \* \* \*